United States Patent [19]

Haraguchi et al.

[11] Patent Number: 5,077,567
[45] Date of Patent: Dec. 31, 1991

[54] WATER-SEALED CAMERA

[75] Inventors: Keisuke Haraguchi; Masahiro Hyakawa, both of Tokyo, Japan

[73] Assignee: Asahi Kogaku Kogyo Kabushiki Kaisha, Tokyo, Japan

[21] Appl. No.: 570,298

[22] Filed: Aug. 20, 1990

[51] Int. Cl.⁵ .............................................. G03B 17/08
[52] U.S. Cl. ....................................................... 354/64
[58] Field of Search ........................................... 354/64

[56] References Cited

U.S. PATENT DOCUMENTS 4,994,829  2/1991  Tsukamoto ............................ 354/64

Primary Examiner—Michael L. Gellner
Attorney, Agent, or Firm—Sandler, Greenblum & Bernstein

[57] ABSTRACT

In a water-sealed camera arranged to be watertight except a portion at which a movable lens barrel is located, the water-sealed camera is further arranged to detachably mount a waterproofing lens cover for watertightly covering the movable lens barrel. Thus, the camera can be arranged to be completely watertight irrespective of the presence of the movable lens barrel.

8 Claims, 2 Drawing Sheets

WATER-SEALED CAMERA

BACKGROUND OF THE INVENTION

The present invention relates to a water-sealed camera, and more particularly to a water-sealed camera arranged in such a manner that a portion relatively movable to a camera body, such as a receiving lens barrel capable of forward and reverse movement, is further sealed against water.

Recently, various Rinds of cameras arranged to be sealed against water have been proposed. These water-sealed cameras remain unaffected when they become wet in the rain or may be used in the sea or rivers.

Cameras have increasingly been fitted with a bifocal, multifocal, or zoom lens, i.e, a portion movable relative to a camera body. The bifocal or zoom lens, hereinafter referred to as the "zoom lens", is arranged in such a manner that the receiving lens barrel is forwardly and reversely moved relative to the camera body. However, it has been difficult to make watertight a gap between the annular receiving lens barrel arranged to be moved and the camera body, or the fixed external cylinder secured on the camera body. If a so-called "O"-ring is employed to make the gap watertight, for instance, a problem still exists in that sliding resistance considerably increases when the receiving lens barrel moves.

Further, during wide angle photography, the receiving lens barrel is located at a position where it is completely retracted within the camera body or the fixed external cylinder. On the other hand, the receiving lens barrel is caused to be completely projected during a telephotography state. In other words, the internal volume of the camera increases when a wide angle photography state is switched to a telephotography state, whereas it reversely decreases when a telephotography state is switched to a wide angle photography state. For this reason, if the gap between the receiving lens barrel and the camera body is made watertight, that is, if zooming operation is carried out to implement the telephotography state while the internal and external pressures are in equilibrium (for example, when the receiving lens barrel has been located in the wide angle photography state), the internal pressure decreases as the internal volume of the camera increases during projection of receiving lens barrel. Consequently, great force becomes required to forwardly project the taking lens barrel. Further, since the internal pressure decreases as the receiving lens barrel is move forward, there is a risk of water penetrating into the camera during forward displacement of the receiving lens barrel.

On the other hand, if the receiving lens barrel is retracted while the internal and external pressures are in equilibrium during a telephotography state, the internal pressure rises as the internal volume decreases. Great force is therefore also required to retract the receiving lens barrel.

The above-described problems occur in a macro lens arranged in a manner such that movement of the lens barrel along the optical axis tends to become greater.

SUMMARY OF THE INVENTION

It is therefore an object of the present invention to provide an improved water-sealed camera having a movable receiving lens barrel.

For this purpose, according to the present invention, there is provided a water-sealed camera including at least a predetermined portion arranged to be watertight at which a movable member is located, said water-sealed camera comprising a cover member for non-watertight covering said predetermined portion.

With the above-constructed water-sealed camera, the receiving lens barrel is arranged to be freely movable in forward and reverse directions because the whole inner volume of the waterproofing lens cover and the camera body remains unchanged. When it is not necessary to make the camera watertight, the waterproofing lens cover may be removed therefrom. The compactness of the camera is thus prevented from being impaired.

BRIEF DESCRIPTION OF THE ACCOMPANYING DRAWINGS

FIG. 1 is a perspective view illustrating the external appearance of a water-sealed camera having a zoom lens according to the present invention and a waterproofing lens cover which is applicable to the water-sealed camera; and FIG. 2 is a sectional view taken along the optical axis with the waterproofing lens cover fitted to the camera of FIG. 1.

DESCRIPTION OF PREFERRED EMBODIMENTS

Referring to drawings of FIGS. 1 and 2, an embodiment of the present invention will subsequently be described.

Figure 1:
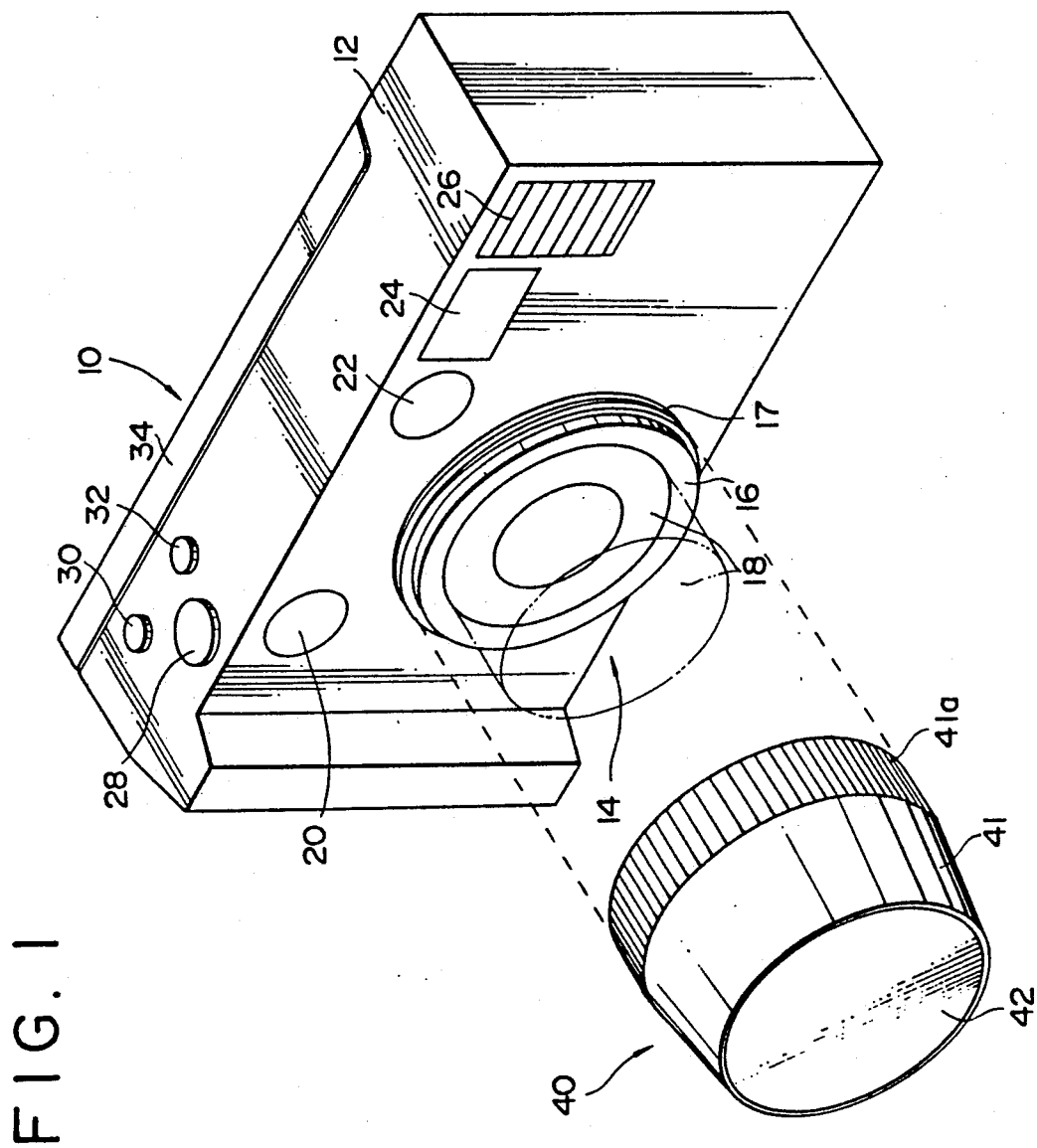
Figure 2:
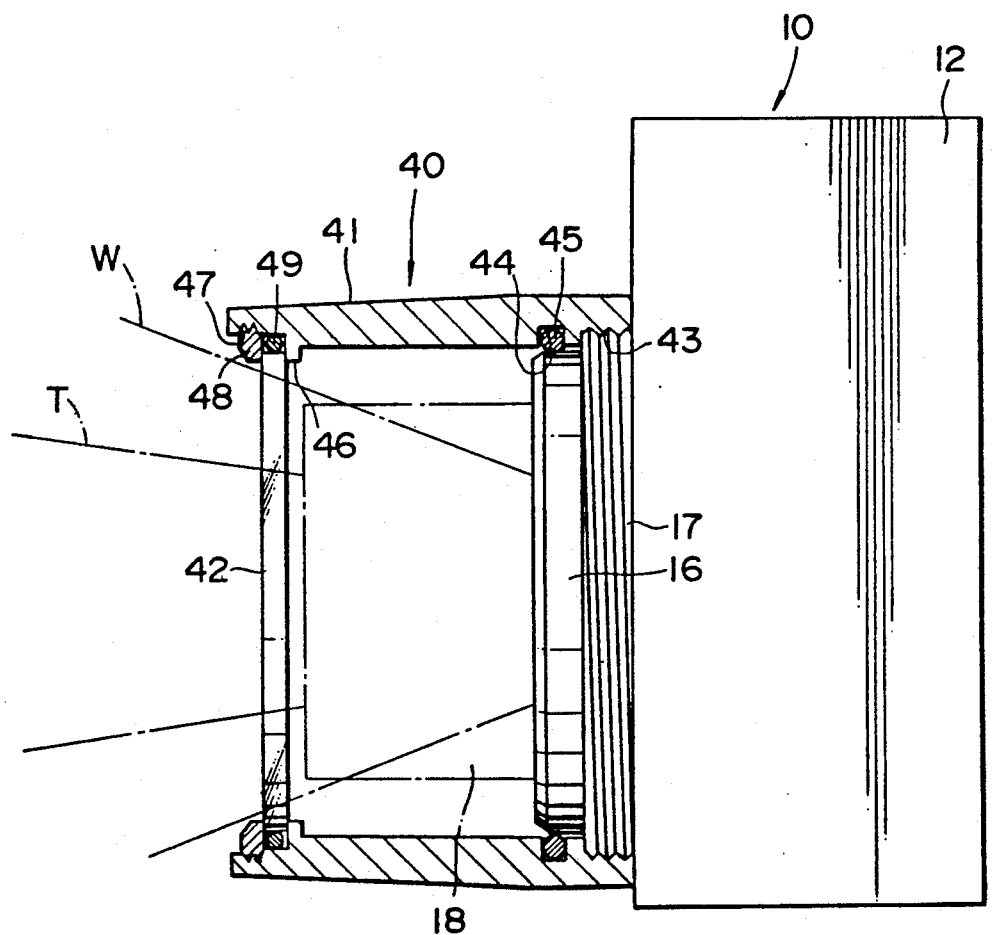

FIG. 1 illustrates the external appearance of a camera having a zoom lens according to the present invention and a waterproofing lens cover which is applicable to the camera, and FIG. 2 is a sectional view illustrating the waterproofing lens cover fitted to the camera taken along an optical axis of light entering into the camera.

The zoom lens camera 10 is fitted with a zoom lens 14 on the front panel of a camera body 12, such as a conventional camera. The zoom lens 14 comprises a fixed external cylinder 16 secured to camera body 12 and a receiving lens barrel 18 fitted into the fixed external cylinder 16 such that the lens barrel is forwardly and reversely movable along the the optical axis of light entering into the camera. The receiving lens barrel 18 is housed within the fixed external cylinder 16 when the lens barrel is retracted, or the camera is in the wide angle photography state, while, in the telephotography state, the lens barrel 18 is caused to be projected from the fixed external cylinder 16. The imaginary line shown in FIG. 1 illustrates a state in which the lens barrel is caused to be completely projected.

A positive screw portion 17 is formed on the outer periphery of the fixed external cylinder 16 and in the vicinity of camera body 12.

The front panel of camera body 12 includes a light emitting window 20 from which range-finding light of a predetermined wave length, for example, infrared light, is emitted, light receiving window 22 for receiving the emitted light which is reflected by an object to be photographed, objective window 24 of a finder system, and light emitting window 26 of a strobe.

A release button 28 and a pair of zoom switches (30, 32) for zooming zoom lens 14 to the wide angle photography state or the telephotography state are provided on the top surface of camera body 12.

A back cover 34 is fitted to the rear surface of camera body 12.

These elements provided on the camera body 12, excluding the gap between the fixed external cylinder 16 and the receiving lens barrel 18 or the gap between the receiving lens barrel and the camera body, are made watertight.

A waterproofing lens cover 40 forms a waterproofing space with a cylindrical portion 41 whose cross-section is arranged to be circle-shaped and a transparent plate 42 secured to the front end of the cylindrical portion 41 in a watertight fashion. A negative screw portion 43 arranged to positive screw portion 17 is formed on the inner surface at the rear end of the cylindrical portion 41, and a revolving groove 44 is formed on the front side of the positive screw portion 17. An "O"-ring 45 for making the aforementioned gap watertight is fitted into the revolving groove 44 to tightly couple the cylindrical portion 41 and the fixed external cylinder 16 and to keep the gap therebetween watertight when the positive and the negative screw portions (17, 43) are brought into engagement with each other.

An internal flange 46 protrudes from the inner periphery at the, leading end of the cylindrical portion 41, which is provided with another negative screw portion 47 on the front side of the internal flange 46. An annular screw 48 engages the negative screw portion 47 to fix transparent plate 42 with internal flange 46 by tightening transparent plate 42 and "O"-ring 49 to make the gap watertight. The gap between the transparent plate 42 and cylindrical portion 41 is thus kept watertight.

A skid-proof cylindrical portion 41a having skid-proof notches is formed on the outer periphery of the trailing end of cylindrical portion 41 and is used when the waterproofing lens cover 40 is revolved. The cylindrical portion 41 is tapered with its diameter gradually decreasing toward the front side of waterproofing lens cover 40. This tapering makes the outer shape of the waterproofing lens cover 40 smaller, thus facilitating holding of the lens cover with the fingers when it is attached and detached.

In addition, the total length of the waterproofing lens cover 40 is set so that the receiving lens barrel 18 is kept from touching transparent plate 42 when it is completely projected. Further, as shown in FIG. 2, the diameter of transparent plate 42 is set so as to prevent rays of light W and T forming an image plane from being blocked during states of wide angle photography state or telephotography.

With the above-described camera thus constructed, the waterproofing lens cover 40 is not removed when the waterproofing function is required. While the waterproofing lens cover 40 is removed, the external appearance of the zoom lens camera 10 remains unchanged and therefore compact.

When the waterproofing function is required, the waterproofing lens cover 40 is fitted to the camera body 12 by engaging the positive and negative screw portions (17, 43). The receiving. The taking lens barrel 18 itself and the gap between the receiving barrel 18 and the fixed external cylinder 16 are kept watertight.

When zoom switches (30, 32) are operated to effect zooming in the waterproofed state, the receiving lens barrel 18 is forwardly and reversely moved with respect to fixed external cylinder 16. When the receiving lens barrel 18 is projected, the volume of the gap between waterproofing lens cover 40 and receiving lens barrel 18 decreases. The air thus decreased flows through the gap between the receiving lens barrel 18 and the fixed external cylinder 16 into the camera body 12. However, the internal volume determined by the waterproofing lens cover 40 and the camera body 12 still remains unchanged. As a result, the projecting movement of the receiving lens barrel 18 is smoothly executed without obstruction by a difference between the internal air pressure of the camera body and the external air pressure.

When the receiving lens barrel 18 is retracted, the internal volume defined by the waterproofing lens cover 40 and camera body 12 also remains unchanged as air flows from the camera body 12 into a space formed by the waterproofing lens cover 40 and camera body 12.

Although the present invention has been described with reference to the embodiment thereof shown in the accompanying drawings, the waterproofing lens cover 40 may be integrally formed by a transparent synthetic resin, for example, plastic. Moreover, a so-called bayonet or click stop mechanism, or any other known structure for engaging the waterproofing lens cover 40 with the camera body 12 in a watertight, state may be utilized. Further, the "O"-ring 45 for making the aforementioned gap watertight may be arranged on the camera body side 12.

As described above, the camera according to the present invention can be made further watertight by putting the waterproofing lens cover on the receiving lens barrel, which is capable of forwardly and reversely moving relative to the camera body. By removing the waterproofing lens cover during normal use when the waterproofing function is not required, the compactness of the camera is prevented from being impaired.

What is claimed is:

1. A water-sealed camera including a predetermined portion arranged to be non-watertight, a lens barrel movable relative to an external cylinder fixed on said water sealed camera, said lens barrel located at said non-water tight predetermined portion, and a cover member for watertightly covering said predetermined portion.

2. The water-sealed camera according to claim 1, wherein said cover member comprises a waterproof lens cover, and further including means for detachably mounting said waterproof lens cover on said water-sealed camera.

3. The water-sealed camera according to claim 2, wherein said waterproof lens cover comprises a cylindrical portion and a transparent plate secured to a side of said cylindrical portion.

4. The water-sealed camera according to claim 2, wherein said means for detachably mounting said waterproofing lens cover comprises a screw portion formed on an inner surface of said waterproofing lens cover and another screw portion formed on said external cylinder.

5. The water-sealed camera according to claim 2, wherein said waterproof lens cover is arranged to be tapered toward the front side of said water-sealed camera when said waterproof lens cover is mounted on said water-sealed camera.

6. A watertight mechanism adapted to be positioned on a device, said device being arranged to be watertight except for a predetermined portion at which a movable member is located, said movable member being movable relative to an external surface of said device, said watertight mechanism comprising a cover member arranged to be detachably mounted on said device for watertightly covering said predetermined portion and said movable member.

7. A waterproof cover member for a camera having a generally cylindrical housing movable relative to a camera body, said cover member comprising:
a generally cylindrical member adapted to fit over the relatively movable housing; and
an annular sealing means at one end of said cylindrical member adapted to mate with a fixed portion of the camera body adjacent to said generally cylindrical member.

8. The waterproof cover member according to claim 7, further comprising a transparent plate secured adjacent the other end of said generally cylindrical member.

* * * * *